United States Patent
Pehlivan et al.

(10) Patent No.: US 9,308,652 B2
(45) Date of Patent: Apr. 12, 2016

(54) ROBOT MODULE AND ROBOT WITH SPACER RODS ARRANGED AT GRAVITY CENTERS

(71) Applicants: Armin Pehlivan, Nuziders (AT); Michael Jaeger, Burs (AT); Thomas Rettig, Rheda-Wiedenbruck (DE)

(72) Inventors: Armin Pehlivan, Nuziders (AT); Michael Jaeger, Burs (AT); Thomas Rettig, Rheda-Wiedenbruck (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 135 days.

(21) Appl. No.: 13/693,780

(22) Filed: Dec. 4, 2012

(65) Prior Publication Data

US 2013/0164107 A1    Jun. 27, 2013

Related U.S. Application Data

(63) Continuation of application No. PCT/EP2011/059438, filed on Jun. 8, 2011.

(30) Foreign Application Priority Data

Jun. 8, 2010   (DE) .......................... 10 2010 029 784
Jun. 8, 2010   (DE) .......................... 10 2010 029 786

(51) Int. Cl.
| *B25J 9/10* | (2006.01) |
| *B25J 17/02* | (2006.01) |
| *B25J 18/02* | (2006.01) |
| *B25J 9/16* | (2006.01) |
| *B25J 9/00* | (2006.01) |

(52) U.S. Cl.
CPC ............ *B25J 17/0266* (2013.01); *B25J 9/0078* (2013.01); *B25J 9/104* (2013.01); *B25J 9/1623* (2013.01); *B25J 18/025* (2013.01)

(58) Field of Classification Search
CPC ........ B25J 9/1623; B25J 9/104; B25J 18/025; B25J 18/06
USPC ........................... 414/735; 901/14; 74/479.01
See application file for complete search history.

(56) References Cited

U.S. PATENT DOCUMENTS

| 3,108,498 | A | * | 10/1963 | Hedin ....................... B25J 9/102 901/15 |
| 4,666,362 | A | * | 5/1987 | Landsberger et al. ........ 414/735 |
| 5,103,403 | A | | 4/1992 | Ch'Hayder et al. |
| 5,114,300 | A | | 5/1992 | Shahinpoor et al. |
| 5,313,854 | A | * | 5/1994 | Akeel ............................. 901/21 |

(Continued)

FOREIGN PATENT DOCUMENTS

| DE | 10 2004 058450 A1 | 6/2006 |
| DE | 10 2008 019 965 A1 | 10/2009 |

(Continued)

*Primary Examiner* — Gerald McClain
(74) *Attorney, Agent, or Firm* — Dorsey & Whitney LLP; Nathaniel P. Longley

(57) ABSTRACT

A robot module including a robot drive and a robot body, the robot body having a spacer rod, a robot head and at least one control arm, wherein a drive platform of the robot drive and an attachment group of the robot head are connected to each other via the spacer rod and the control arm, wherein the robot drive is configured to swivel the robot head by means of the spacer rod and the control arm, wherein an attachment surface of the attachment group comprises a first gravity center and an attachment surface of the drive platform comprises a second gravity center, and wherein the spacer rod is arranged in the first and the second gravity center.

15 Claims, 11 Drawing Sheets

(56) References Cited

U.S. PATENT DOCUMENTS

| | | | |
|---|---|---|---|
| 6,809,495 B2 * | 10/2004 | Rodnunsky | 248/59 |
| 7,172,385 B2 | 2/2007 | Khajepour et al. | |
| 8,452,453 B2 * | 5/2013 | Zhang et al. | 901/21 |
| 2004/0146388 A1 * | 7/2004 | Khajepour | B25J 17/0266 414/680 |
| 2011/0089709 A1 * | 4/2011 | Neeper | B25J 9/102 294/119.1 |
| 2011/0120254 A1 * | 5/2011 | Zhang et al. | 901/15 |
| 2011/0316467 A1 * | 12/2011 | Nishida et al. | 318/611 |

FOREIGN PATENT DOCUMENTS

| | | |
|---|---|---|
| EP | 2241416 | 10/2010 |
| FR | 2910833 | 7/2008 |
| JP | 10011143 | 1/1998 |

* cited by examiner

ROBOT MODULE AND ROBOT WITH SPACER RODS ARRANGED AT GRAVITY CENTERS

CROSS-REFERENCE TO RELATED APPLICATIONS

This application is a continuation of International Patent Application No. PCT/EP2011/059438, filed Jun. 8, 2011, which claims priority to German Patent Application No. 102010029786.0, filed Jun. 8, 2010 and German Patent Application No. 102010029784.4, filed Jun. 8, 2010. The entirety of each application is hereby incorporated by reference.

FIELD

The present invention relates to a robot module and a robot.

BACKGROUND

Present-day production and packaging facilities increasingly require shorter cycle times while often having complex traverses. In order to put into effect these shorter cycle times, production and packaging facilities comprise at least one robot structure which may be moved around numerous axes, the robot structure moving an actuator arranged at the robot structure. At the same time, there is an endeavor in present-day production and packaging facilities to reduce cycle times with identical trayerse. In order to reduce the present cycle times, e.g. the moving masses of the used robots of production and packaging facilities may be reduced in order to be able to accelerate the robots' robot kinematics more quickly.

For assembling a light-built robot, the cable robot known from U.S. Pat. No. 4,666,362 is suitable. The moving masses of the cable robot are small in particular due to the fact that the drives for the individual various axes do not have to be moved together with the robot. Furthermore, cables of the cable robot may take up and transfer major loads while simultaneously having a low weight.

The cable robot known from U.S. Pat. No. 4,666,362 comprises a drive platform and a work plate which is spaced from the drive platform, the work plate being connected to the drive platform by means of a spacer rod. Furthermore, the work plate and the drive platform are coupled with six cable pulls, wherein the cable pulls are each actuated by one cable pull drive which is arranged at the drive platform and which variably alters the length of the corresponding cable pull. By specifically controlling the individual cable pull drives and thus the cable pulls, the work plate may be moved in six axial directions. One of these axial directions is a rotation of the work plate about its surface normal. However, the assembly of the robot known from U.S. Pat. No. 4,666,362 only allows for a very limited rotation angle.

Further, from U.S. Pat. No. 5,114,300 a robot structure comprising a first robot module having a first and a second platform is known. The first and the second platforms are connected via various elements which may be adjusted in their lengths. Furthermore, the second robot module is arranged at the second platform, the second robot module having the same structure as the first robot module. Due to the length-adjustable elements, the second platform may be moved in space, twisted and/or tilted with regard to the first platform. The second robot module may also carry out these kinds of motion with regard to the first robot module. Various embodiments of linear actuators such as a screw bar, a cable-operated bar or a hydraulic/pneumatic cylinder are suggested as length-adjustable elements.

SUMMARY

The present invention provides a weight-optimized robot module and a weight-optimized robot which may be moved about numerous axes and may be adapted to a kinematic job in a flexible manner.

According to one embodiment of the invention, a robot module comprises a robot drive and a robot body, the a robot body having a spacer rod, a robot head and at least one control arm. A drive platform of the robot drive and an attachment group of the robot head are connected to each other via the spacer rod and the control arm. The robot drive is configured to swivel the robot head by means of the spacer rod and the control arm. An attachment surface of the attachment group comprises a first gravity center and an attachment surface of the drive platform comprises a second gravity center, wherein the spacer rod is arranged in the first and the second gravity center.

According to another embodiment of the invention, a robot module comprises a robot drive and a robot head. The robot drive is configured to swivel the robot head. The robot head comprises an actuator group and an attachment group, the actuator group being coupled to the attachment group by means of a transmission gearing The transmission gearing is configured to convert a twist of the attachment group into a twist of the actuator group according to a predetermined transmission ratio.

According to another embodiment of the invention, a robot comprises at least a first robot module and a second robot module. The first robot module and the second robot module each comprises a robot drive, a spacer rod, a robot head and at least one control arm, a drive platform of the robot drive and an attachment group of the robot head being connected to each other via the spacer rod and the control arm, wherein any of the attachment group and the drive platform of the first robot module is arranged at any of the attachment group and the drive platform of the second robot module.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
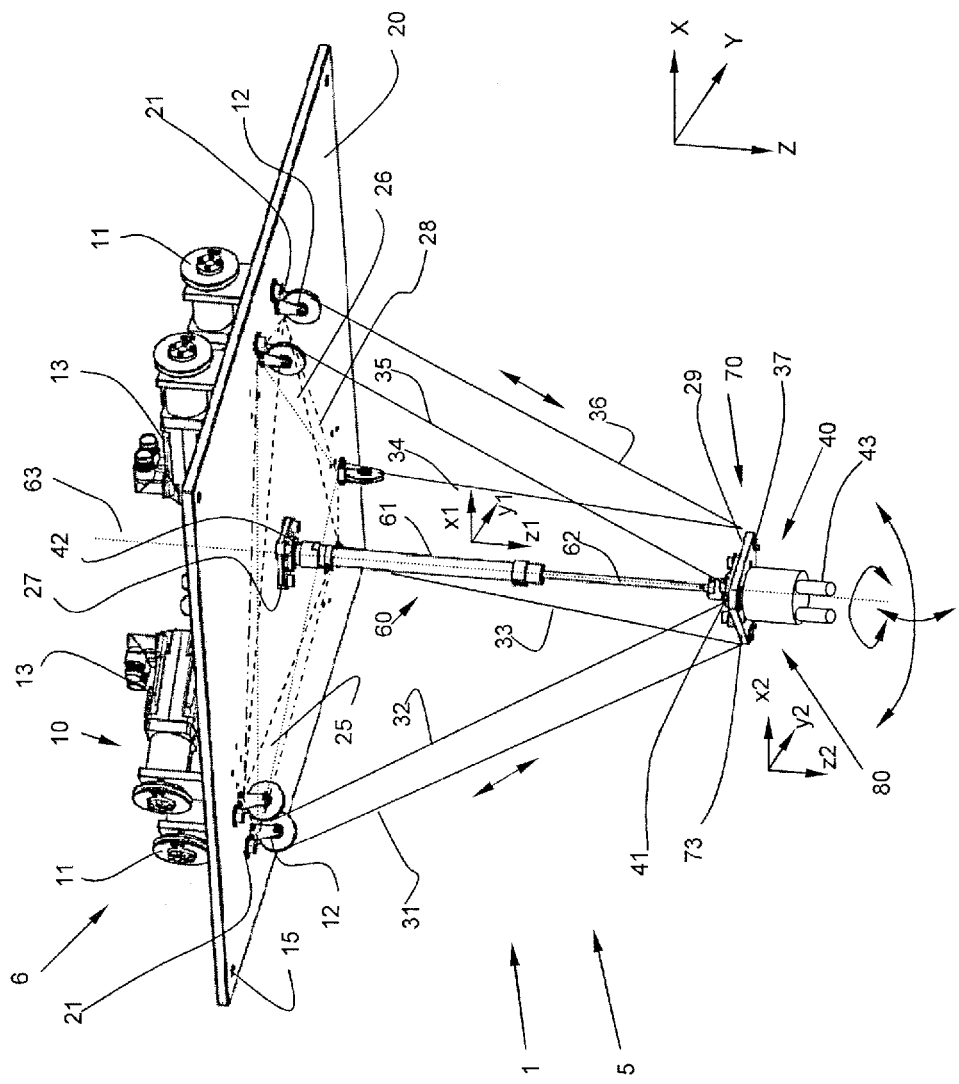
FIG. 1 depicts a perspective view of a cable robot.

FIG. 1 depicts a perspective view of a cable robot 1 comprising a robot body 5 and a robot drive 6. Furthermore, a global coordinate system having axes x, y, z being perpendicular to each other and two further local coordinate systems for the traveling components of the robot body 5 having axes $x_1, y_1, z_1$ and/or $x_2, y_2, z_2$ being perpendicular to each other are shown in FIG. 1. The depicted coordinate systems are to illustrate the operating mode of the cable robot 1.

The robot drive 6 of the cable robot 1 comprises a square-shaped drive platform 20 having attachment apertures 15 arranged in the corner region for attaching the drive platform 20 to a not-shown support frame. The robot drive 6 further comprises six cable pull drives 10 arranged at the top side of the square-shaped drive platform 20. The cable pull drives 10 each comprise an electromotor 13 having a drive transmission and a cable drum 11 attached to the drive transmission. Furthermore, a sensor (not depicted) is provided at each cable pull drive 10 whereby it is possible to determine the position of the associated cable drum 11.

The robot body 5 of the cable robot 1 comprises a spacer rod 60, six cable pulls 31 to 36 as control arms with corresponding deflection pulleys 12 and a robot head 40. At the bottom side opposite to the assembly of cable pull drives 10, the deflection pulleys 12 are attached to the drive platform 20 of the robot drive 6. The deflection pulleys 12 each comprise a first cable pull lead-through 21 arranged in the drive platform 20. The spacer rod 60 connects the robot head 40 to the drive platform 20 of the robot drive 6. For this purpose, the spacer rod 60 is connected to the bottom side of the drive platform 20 of the robot drive 6, preferably by means of a first upper joint 42. A lower second joint 41 is arranged at the top side of the robot head 40, the lower second joint 41 connecting the robot head 40 to the lower end of the spacer rod 60. At the bottom side of the robot head 40 a gripping device 43 is preferably arranged.

The spacer rod 60 of the robot body 5 is arranged opposite to the drive platform 20 of the robot drive 6 in a swiveling manner and comprises its own coordinate system with the axes $x_1, y_1, z_1$ being perpendicular to each other. In the position of the spacer rod 60 shown in FIG. 1, the axes $x_1, y_1, z_1$ of the coordinate system of the spacer rod 60 run approximately in parallel to the global coordinate system x, y, z.

The spacer rod 60 comprises a telescope-like configuration having an upper external part 61 of the spacer rod 60 and a lower part 62 which may be retracted into the external part 61. Thus, the spacer rod 60 comprises an alterable length. Furthermore, on its inner side the spacer rod 60 comprises a spring element which is not depicted further and which is configured to press the lower part 62 of the spacer rod 60 out of the upper part 61, the spacer rod 60 thus pressing the robot head 40 away from the drive platform 20 (in FIG. 1 in z-direction or, respectively, in $z_1$-direction). The spacer rod 60 may e.g. be configured as air-pressure spring, oil-pressure spring or torsion bar spring.

The spacer rod 60 of the robot body 5 is configured in a torsion-proof manner so that the lower part 62 of the spacer rod 60 cannot be twisted about a longitudinal axis 63 ($z_1$ axis) of the spacer rod 60 with regard to the upper part 61. A torsional resistance of the spacer rod 60 may e.g. be achieved by the lower part 62 comprising an bulge (not depicted) which runs in parallel to the longitudinal axis 63 of the spacer rod 60 and which is arranged at the lower part 62 in a circumferential manner. The upper part 61 comprises a groove (not depicted) corresponding to the bulge, the bulge of the lower part 62 engaging in the groove in order to thus prevent a twist of the lower part 62 of the spacer rod 60 with regard to the upper part 61 of the spacer rod 60. Of course, other configurations of the spacer rod 60 are also conceivable. However, in the configuration of the spacer rod 60, the torsion-proof construction of the spacer rod 60 is essential.

As has already been mentioned above, the spacer rod 60 of the robot module 5 is attached at the bottom side of the drive platform 20 by means of the upper joint 42 and at the top side of the robot head 40 by means of the lower joint 41. Thereby, in the embodiment shown in FIG. 1, the upper joint 42 is configured in a torque-proof or, respectively, torsion-proof manner about the $z_1$-axis or, respectively, the surface normal (z-axis) of the drive platform 20 of the robot drive 6 so that the upper part 61 of the spacer rod 60 cannot be twisted about the $z_1$-axis, however allowing for swiveling the spacer rod 60 about the x-axis and the y-axis at the drive platform 20.

The lower joint 41 at the robot head 40 is also configured in the same manner so that the lower joint 41 may be swiveled about the $x_1$-axis and the $y_1$-axis, but cannot be twisted about the $z_1$-axis (or, respectively, $z_2$-axis). Thereby, the lower joint 41 may, as the upper joint 42, e.g. be configured as homokinetic joint or as cardan joint. Of course, further embodiments of the upper and/or lower joint 41, 42 are conceivable which prevent a twist of the lower joint 41 about the longitudinal axis 63 of the spacer rod 60.

At each cable drum 11 of the cable pull drive 10, one of the cable pulls 31 to 36 is respectively attached. The cable pulls 31 to 36 are furthermore guided through the drive platform 20 to an attachment group 70 of the robot head 40 via the first cable pull lead-throughs 21 and via the deflection pulleys 12, the cable pulls 31 to 36 being attached to said attachment group 70. Thereby, the deflection pulleys 12 are configured at the drive platform 20 as anchor points of the cable pulls 31 to 36 and each transfer a fraction of a tensile force of the cable pulls 31 to 36 to the drive platform 20.

The deflection pulleys 12 which are configured as first cable suspension points form a hexagonal first attachment surface 28 at the drive platform 20 of the robot drive 6. The first attachment surface 28 is formed of two respective triangles 25, 26 which are displayed in a dotted manner in FIG. 1. The corners of the two triangles 25, 26 are defined by the first cable suspension points and/or the deflection pulleys 12, wherein a first triangle 25 is defined by the deflection pulleys 12 of the three cable pulls 31, 34, 35. The second triangle 26 is formed by the deflection pulleys 12 of the cable pulls 32, 33, 36. The second triangle 26 geometrically corresponds to the first triangle 25; however the second triangle 26 is twisted by a gravity center 27 of the first triangle 25. Thus, the deflection pulleys 12 or, respectively, the first cable suspension points are arranged on a circumcircle (not depicted) about the gravity center 27 of the first triangle 25.

In the embodiment shown in FIG. 1, a small twist of the second triangle 26 with regard to the first triangle 25 has been selected so that the deflection pulleys 12 are arranged on the drive platform 20 approximately in pairs, wherein the pairs of deflection pulleys 12 are respectively formed by a deflection pulley 12 of the first triangle 25 and by a deflection pulley 12 of the second triangle 26 adjacent to the deflection pulley 12 of the first triangle 25. Thereby, the two deflection pulleys 12 each comprise a distance between the pairs of deflection pulleys 12.

The robot head 40 comprises an attachment group 70 arranged on its top and an actuator group 80 attached at the bottom side of the attachment group 70, the actuator group 80 comprising the gripping device 43. The actuator group 80 is coupled to the attachment group 70 by means of a transmission gearing 50 depicted and explained in more detail in FIGS. 2 to 4.

The robot head 40 is pivot-mounted with regard to the drive platform 20 and the spacer rod 60 and comprises its own coordinate system having the axes $x_2$, $y_2$, $z_2$ being perpendicular to each other. In the position of the robot head 40 depicted in FIG. 1, the axes $x_2$, $y_2$, $z_2$ of the coordinate system of the robot head 40 approximately run in parallel to the global coordinate system x, y, z.

The attachment group 70 of the robot head 40 comprises an attachment plate 73 which is preferably configured approximately in triangle shape, wherein in each corner of the attachment plate 73, two cable pulls 31 to 36 are respectively attached to the attachment plate 73 in cable suspension points 37. In the cable suspension points 37, a cable pull 31, 34, 35 of the first triangle 25 and a cable pull 32, 33, 36 of the second triangle are respectively brought together, wherein, however, those cable pulls 31 to 36 of the two triangles 25, 26 are brought together, the deflection pulleys 12 of which are arranged at the drive platform 20 at a distance from each other, wherein respectively a cable pull 31 to 36 brought together in the second cable suspension point 37 originates from a different pair of deflection pulleys 12. Thus, e.g. the cable pull 35 of the first triangle 25 and the cable pull 32 of the second triangle 26 are brought together in the cable suspension point 37 which for the viewer is arranged on the front side in FIG. 1 and attached to the attachment plate 73.

The cable suspension points 37 of the attachment plate 73 respectively comprise a second distance to each other, wherein the respective second distances are in the same ratio to the respective first distances of the deflection pulleys 12. In the embodiment, the ratio of the two distances to each other has been selected in such a way that the cable pulls 31 to 36 run approximately in parallel from the deflection pulleys 12 to the second attachment points 37 in an untwisted state of the robot head 40 and/or untwisted with regard to the $z_2$-axis of the attachment plate 73, wherein the cable pulls 31 to 36 are attached to two second cable suspension points 37 arranged next to each other, the cable pulls 31 to 36 respectively coming from a pair of deflection pulleys 12. However, another arrangement of the cable pulls 31 to 36 at the robot head 40 and/or at the deflection pulleys 12 at the drive platform 20 is conceivable, as well.

In order to determine the position of the robot head 40 in a traverse area of the cable robot 1, the spacer rod 60 presses the robot head 40 away from the drive platform 20, as explained above. In the embodiment, the cable pulls 31 to 36 absorb the compressive force of the spacer rod 60 and transfer it at least partially to the drive platform 20 via the deflection pulleys 12. Furthermore, the cable pulls 31 to 36 are configured to absorb a force applied to the gripping device 43, e.g. a load to be traversed (not depicted), and also to support the load at the drive platform 20.

If the cable pulls 31 to 36 are actuated via the cable pull drives 10, the length of the cable pull 31 to 36 is elongated or shortened accordingly. In this manner, the robot head 40 may be traversed in the traverse area about the three axes of the global coordinate system x, y, z in the embodiment shown in FIG. 1. Furthermore, the robot head 40 may be tilted about the $x_1$-axis and the $y_1$-axis and swiveled about the surface normal ($z_2$-axis) of the attachment plate 73 of the attachment group 70. In order to safeguard a uniform load distribution on the cable pulls 31 to 36 while traversing the robot head 40, the spacer rod 60 is arranged in respectively one gravity center of the attachment surface 28, 29 with the upper and lower joints 41, 42.

In order to twist the gripping device 43 of the actuator group 80 about the $z_2$-axis of attachment plate 73 of the attachment group 70, the cable pull drives 10 of the robot drive 6 are actuated in such a way that the cable pulls 32, 33, 36 are tightened or, respectively, their lengths are shortened, whereas in contrast the lengths of the cable pulls 31, 35, 34 are elongated in the same manner. Corresponding to the elongation or, respectively, shortening of the cable pulls 31 to 36, the attachment group 70 or, respectively, the attachment plate 73 of the robot head 40 is swiveled about the $z_2$-axis.

Figure 2:
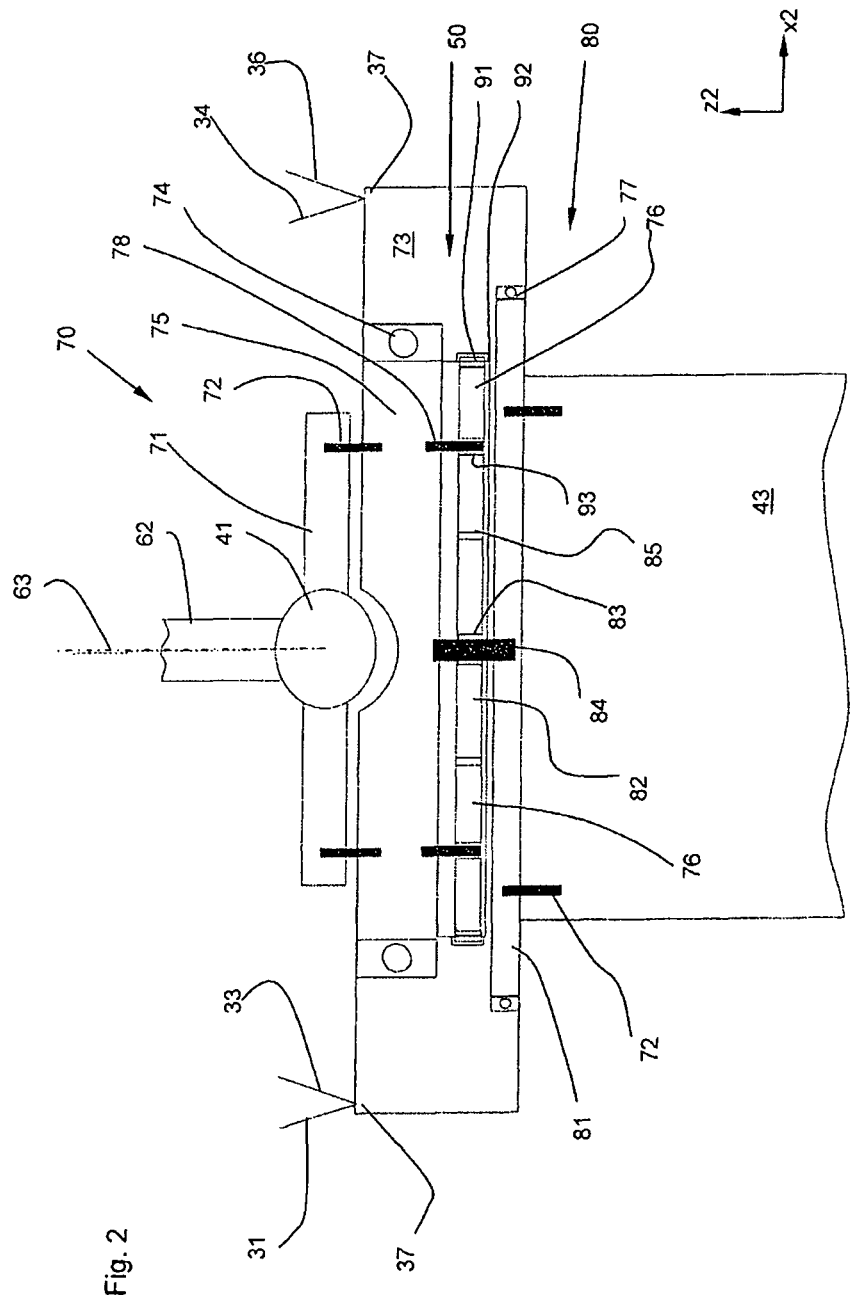
FIG. 2 depicts a schematic view of a section through a robot head of the cable robot shown in FIG. 1.
Figure 3:
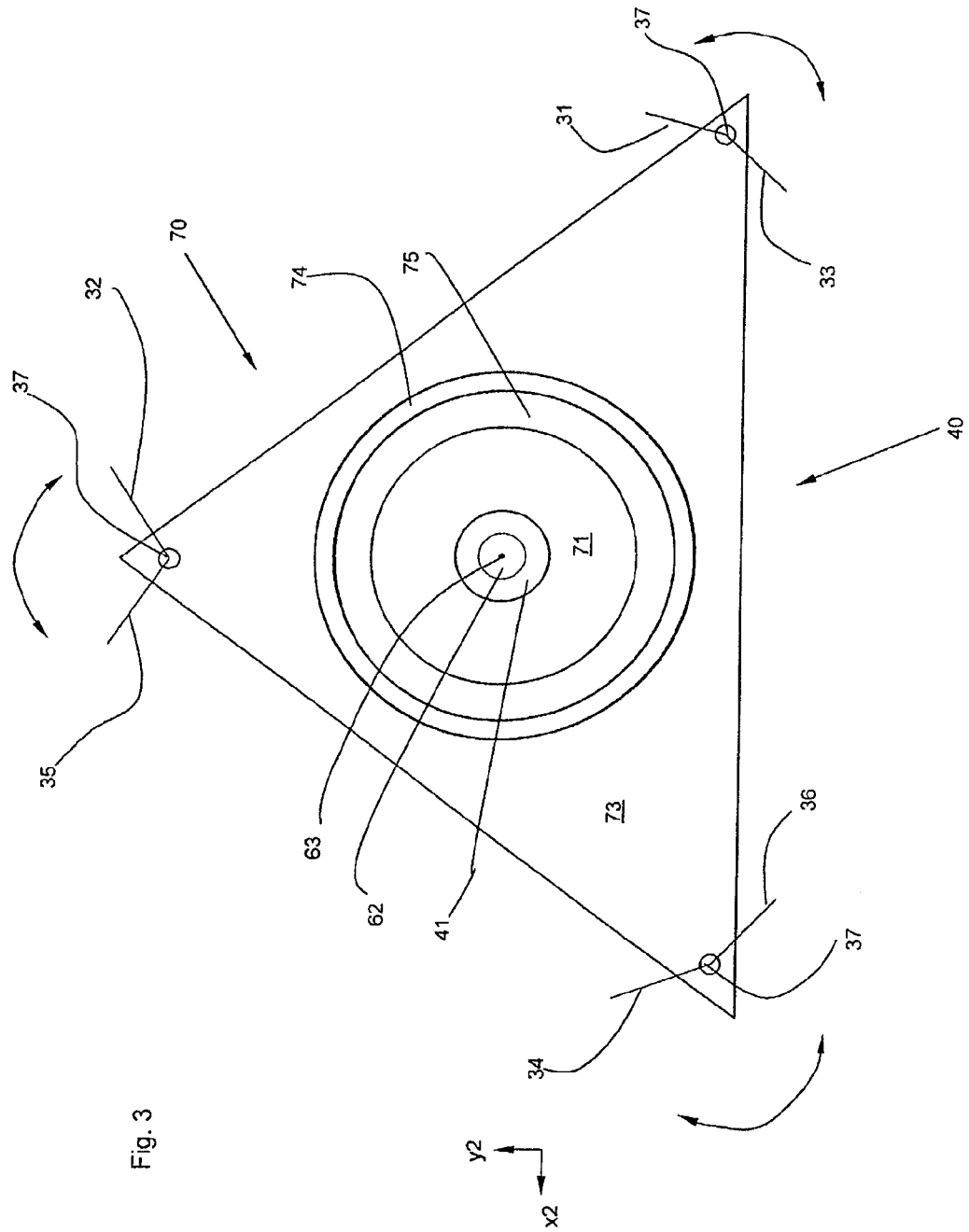
FIG. 3 depicts a schematic top view onto the robot head shown in FIG. 2.
Figure 4:
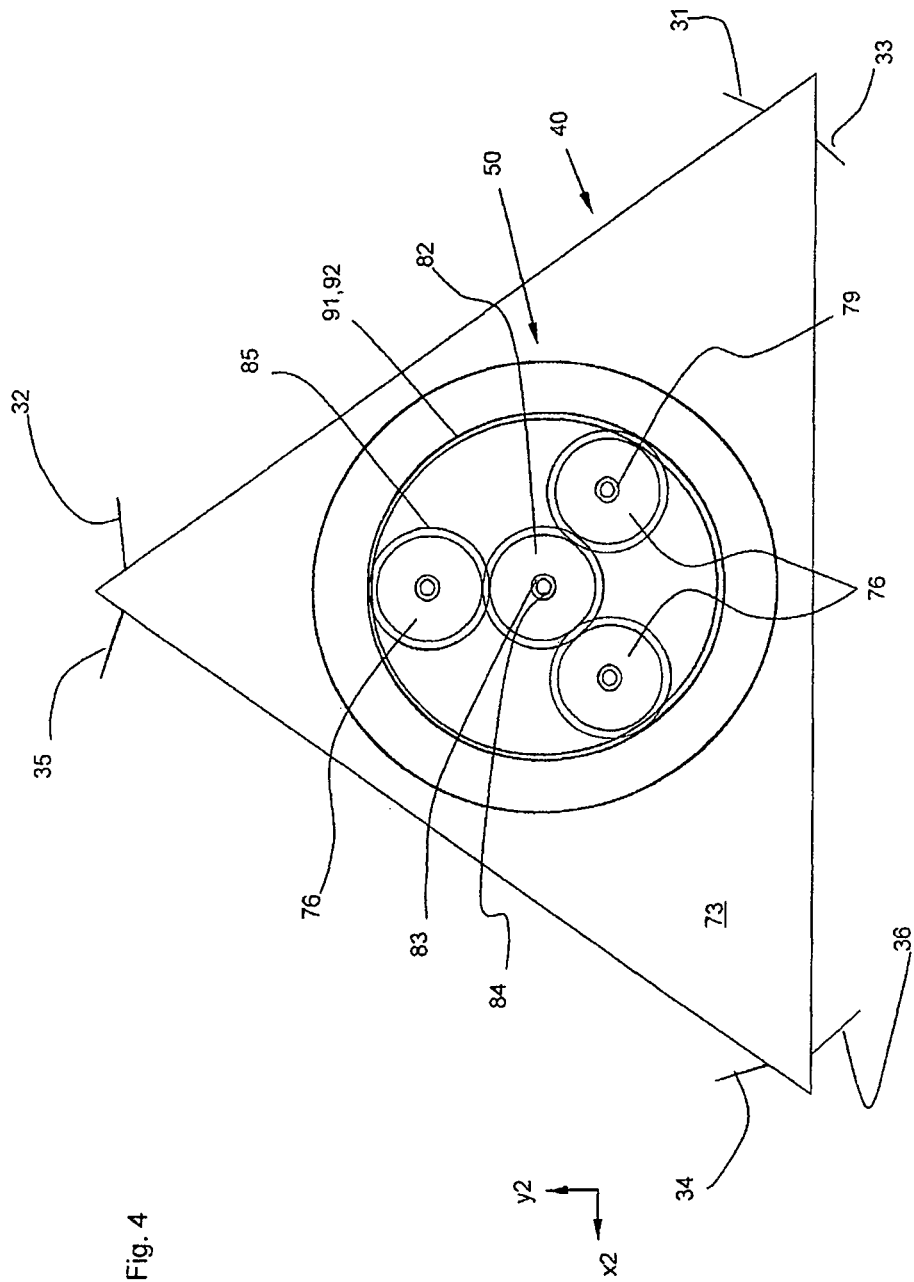
FIG. 4 shows a schematic bottom view of the robot head shown in FIG. 2.

A transmission of the twist about the $z_2$-axis of the attachment group 70 to the gripping device 43 of the actuator group 80 by means of a transmission gearing 50 will be addressed separately in FIGS. 2 to 4.

Alternatively to the embodiment depicted here, it is conceivable that the second triangle 26 of the first cable suspension points or, respectively, of the deflection pulleys 12 is with regard to the first triangle 25 of the deflection pulleys 12 twisted about the gravity center 27 of the first triangle 25 in such a way that the second triangle 26 overlaps with the first triangle 25 and the deflection pulleys 12 of the second triangle 26 are arranged at the deflection pulleys 12 of the first triangle 25. This results in sloping cable pulls 31 to 36, wherein in FIG. 1, according to the alternative, e.g. the cable pull 32 comprises a first cable suspension point together with the cable pull 31. The two cable pulls 31, 32 are, however, attached to the attachment plate 73 of the attachment group 70 in two different cable suspension points 37 with respectively a further cable pull 33 to 36. This guarantees a particularly stable configuration of the cable robot 1.

It is pointed out that, instead of the cuboid-shaped configuration of the drive platform 20, numerous other configuration shapes of the drive platform 20 are conceivable as well, such as circular, trapezoid or polygon-shaped.

FIG. 2 depicts a schematic view of a section through the robot head 40 shown in FIG. 1 in the $x_2$-$z_2$-plane on the middle level of the lower joint 41. A schematic top view onto the robot head 40 is depicted in FIG. 3 and a schematic bottom view of the robot head 40 in a partly mounted state is depicted in FIG. 4.

As has been explained above, the attachment group 70 comprises the transmission gearing 50 besides the attachment plate 73 and an articulated beam 71. In FIGS. 2 to 4, the transmission gearing 50 is configured as a planetary gearing comprising an annulus gear 92, preferably three planet gears 76, a planetary carrier 75 and a sun gear 82. Additionally, the planetary carrier 75 of the planet gearing 50 comprises an attachment bolt 84 for attaching the actuator group 80 and corresponding to the planet gears 76 three planetary carrier bolts 78 for attaching the planet gears 76. Besides the gripping device 43, the actuator group 80 coupled with the attachment group 70 comprises a work plate 81 connected to the gripping device 43.

The planet gears 76 and the sun gear 82 of the planetary gearing 50 are configured as spur gears and circumferentially comprise external teeth 85 which correspond to internal teeth 91 of the annulus gear 92 arranged at an internal circumferential surface.

The planetary carrier 75 of the planetary gearing 50 is completely radially encircled by the attachment plate 73 of the attachment group 70. At a circumferential surface of the planetary carrier 75 which is located externally in a radial direction a first bearing 74 of the planetary carrier 75 is provided, the first bearing 74 being arranged at an inner surface of the attachment plate 73. The first bearing 74 of the planetary carrier 75 guarantees a radial as well as an axial attachment of the planetary carrier 75 at the attachment plate 73.

At the bottom side of the planetary carrier 75 which is arranged opposite to the articulated plate 71, a planet gear 76 of the planetary gearing 50 is respectively attached by means of three planetary carrier bolts 78. The planetary carrier bolts 78 provide the planet gears 76 of the planetary gearing 50 with an axial and a radial second bearing 93.

Between the planet gears 76 depicted in FIG. 2, the sun gear 82 of the planetary gearing 50 is centrically arranged. The sun gear 82 is arranged at a bottom side of the work plate 81 of the actuator group 80 by means of the attachment elements 72.

The work plate 81 of the actuator group 80 is radially mounted at the attachment plate 73 in a radial circumferential direction by means of a third bearing 77. In an axial direction, the work plate 81 of the actuator group 80 is mounted to the planetary carrier 75 by means of the attachment bolt 84 which is arranged at the bottom side of the planetary carrier 75 of the planetary gearing 50.

Between the first bearing 74 of the planetary carrier 75 of the planetary gearing and the third bearing 77 of the work plate 81 of the actuator group 80, the annulus gear 92 of the planetary gearing 50 is attached to the attachment plate 73 of the attachment group 70. The annulus gear 92 may be configured as a separate component of the planetary gearing 50 and may be attached to the attachment plate 73 of the attachment group 70 or it may be formed integrally with the attachment plate 73 of the attachment group 70.

In the mounted state the external teeth 85 of the planet gears 76, located externally in a radial direction, mesh with the internal teeth 91 of the annulus gear 92. Furthermore, the external teeth 85 of the planet gears 76, located internally in a radial direction, also mesh with the external teeth 85 of the sun gear 82.

The articulated beam 71 of the attachment group 70 is arranged above the attachment plate 73 and connects the lower joint 41 with the planetary carrier 75 of the planetary gearing 50 being arranged at the bottom side of the articulated beam 71 by means of the attachment elements 72.

The planetary carrier 75 of the planetary gearing 50 is connected to the drive platform 20 via the articulated beam 71 of the attachment group 70, the lower joint 41, the torsion-proof spacer rod 60 as well as the upper joint 42, the planetary carrier 75 of the planetary gearing 50 thus being torque-proof with regard to the twist about the $z_2$-axis.

If due to a corresponding actuation of the cable pull drives 10 of the robot drive 6 the attachment plate 73 of the attachment group 70 is twisted about the $z_2$-axis, the annulus gear 92 of the planetary gearing 50 connected to the attachment plate 73 is also twisted. Due to the planet gears 76 meshing with the internal teeth 91, the planet gears 76 are set in rotation, whereby the sun gear 82 of the planetary gearing 50 is in turn driven. Due to the differing diameters of the sun gear 82, the planet gears 76 and the annulus gear 92 of the planetary gearing, a rotation angle by which the attachment plate 73 of the attachment group 70 is twisted about the $z_2$-axis is transmitted into a transmitted rotation angle at the sun gear 82 by means of the transmission ratio of the planetary gearing 50. The sun gear 82 of the planetary gearing 50 swivels the work plate 81 of the actuator group 80 arranged at the sun gear 82 and comprising the gripping device 43 about the $z_2$-axis.

If a transmission ratio smaller than 1 is advantageously selected for the planetary gearing 50, this results in the rotation angle by which the attachment plate 73 of the attachment group 70 is twisted being enlarged corresponding to the transmission ratio of the planetary gearing 50. This guarantees that the gripping device 43 may be provided with an enlarged operating range or, respectively, an enlarged rotational freedom, whereas, in contrast, the masses of the robot head 40 may at the same time be maintained low. Furthermore, additional cabling for a drive of the gripping device 43 of the robot head 40 for twisting the gripping device 43 may be abandoned.

The embodiment of the cable robot 1 shown in FIGS. 1 to 4 comprises a range of rotation of approximately 30° in each direction of rotation about the $z_2$-axis. In order to be able to provide the gripping device 43 of the robot head 40 with a sufficiently large range of rotation of approximately 90° in each direction, the planetary gearing 50 comprises a transmission ratio of 1:3 so that the gripping device 43 is twisted by 90° about the $z_2$-axis by twisting the attachment plate 73 by 30°.

In the embodiment shown in FIGS. 2 to 4, the transmission gearing 50 is embodied as planetary gearing. However, other embodiments of transmission gearings such as spur gearings, worm gearings or friction gearings are alternatively conceivable.

In the planetary gearing 50 shown in the embodiment, the planetary carrier 75 is retained for determining the transmission ratio of the planetary gearing 50 and the annulus gear 92 is used as input and the sun gear 82 as output of the planetary gearing 50. However, it is alternatively also conceivable to connect the planetary carrier 75 with the attachment group 70 as input side and to connect the annulus gear 92 externally with the actuator group 80, wherein the sun gear 82 of the planetary gearing 50 is thereby connected to the spacer rod 60 of the robot body 5 in a torque-proof manner. Of course other combinations for determining the transmission ratio of the planetary gearing 50 are conceivable, as well.

In the embodiment, the gripping device 43 is arranged at the work plate 81 of the actuator group 80. Of course, instead of the gripping device 43, various other actuators may be arranged which respectively correspond to the operation purpose. Suction devices, sensor devices or optic devices are in particular conceivable instead of the gripping device 43.

Figure 5:
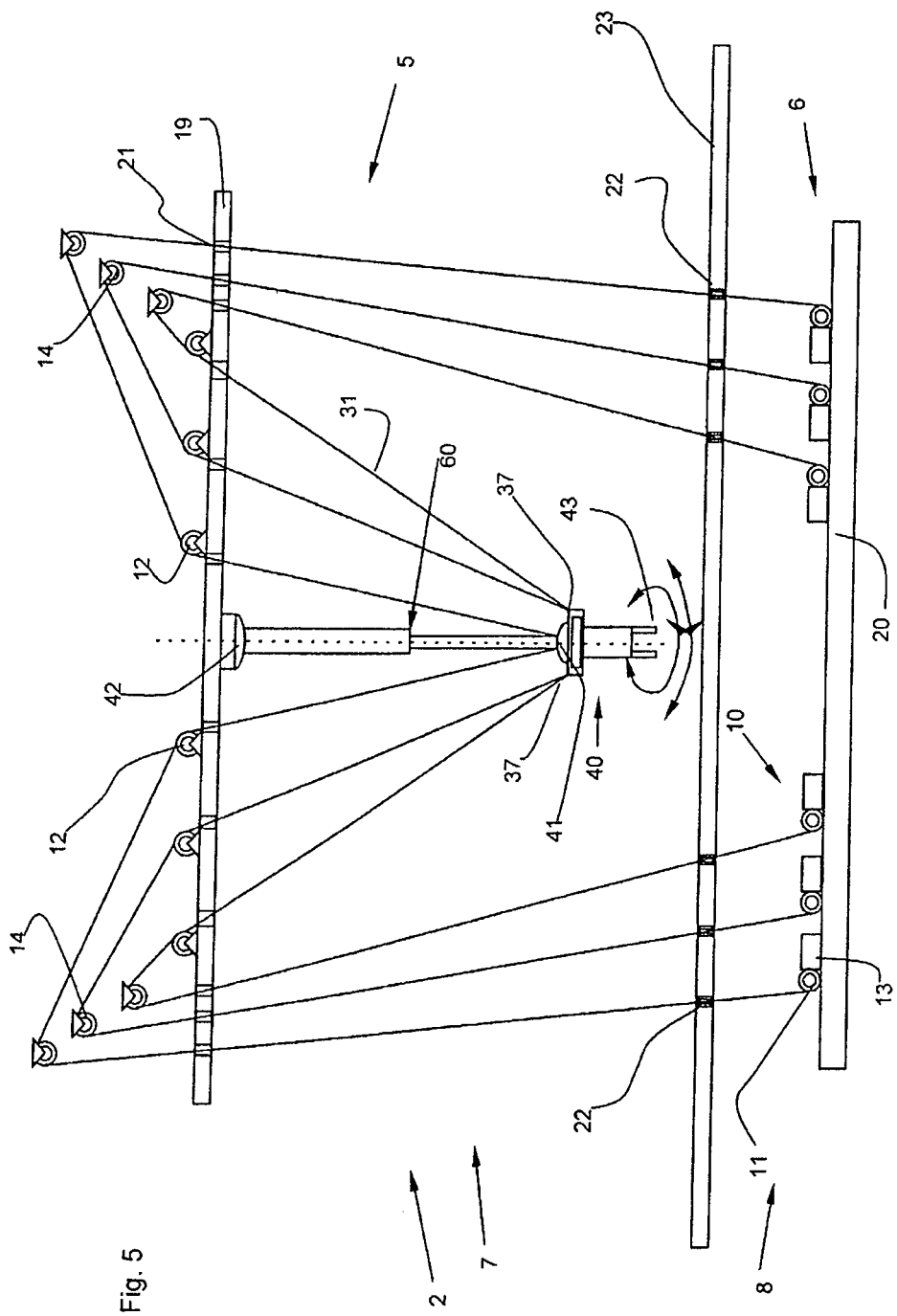
FIG. 5 shows a modification of the configuration of the cable robot shown in FIG. 1.

FIG. 5 shows a schematic depiction of a modified robot 2. The modified robot 2 essentially corresponds to the cable robot 1 depicted in FIGS. 1 to 4.

The modified cable robot 2 comprises a working space 7 in which the robot body 5 is arranged and a driving space 8 which is sealed from the working space 7. For attaching the deflection pulleys 12 and the spacer rod 60, the robot body 5 comprises a carrier plate 19. Thereby, the deflection pulleys 12 are arranged on the top of the carrier plate 19 on the side which is arranged opposite to the spacer rod 60. On the bottom side of the carrier plate 19 of the robot body 5, the spacer rod 60 is arranged. Moreover, a plurality of further deflection pulleys 14 is arranged in the working space 7 for cable guiding. Furthermore, the modified robot 2 comprises a separating wall 23 which spatially separates the robot body 5 from the robot drive 6 with the drive platform 20 and the cable pull drives 10.

The carrier plate 19 as well as the separating wall 23 comprises cable pull lead-throughs 21, 22 in order to guide the cable pulls 31 to 36 through the carrier plate 19 or, respectively, the separating wall 23. In this context, the second cable pull lead-throughs 22 at the separating wall 23 are sealed with respect to the working space 7 so that an exchange of gases, fluids and/or solid matter between the working space 7 and the power unit 8 is prevented. This configuration of the modified cable robot 2 is particularly suitable for use in the food industry. In this context, the robot drive 6 is located in the power unit 8 sealed off with respect to the working space 7 and is thus protected from the aggressive cleaning agents typically used in food industry, allowing for the cable pull drives 10 to be configured in an un-sealed and cost-efficient manner. Since the robot body 5 does not comprise any further drives except for the gripping device 43, the robot body 5 may be designed in a cost-efficient manner.

In particular it is pointed out that the depicted cable robots 1, 2 may also be implemented in another or, respectively, a modified configuration. In particular, e.g. the arrangement of the first and/or second joints 41, 42 within the first and/or second attachment surface 28, 29 may be freely selected depending on the operation purpose of the cable robot 1, 2. It is also conceivable that the first and/or the second joints 41, 42 are arranged outside the plane of the first and/or second attachment surface 28, 29. It is furthermore also conceivable to configure at least one of the two joints 41, 42 in a rigid manner or provided with only one degree of freedom.

Alternatively to the depicted embodiment with six cable pull drives 10, any number and arrangement of cable pull drives 10 with cable pulls 31 to 36 is conceivable. In this context it is essential that the cable pull drives 10 may twist the attachment plate 73 of the attachment group 70 about their surface normal ($z_2$-axis) or, respectively, about the longitudinal axis 63 of the spacer rod 60 by means of the cable pulls 31 to 36. Corresponding to the number of cable pulls 31 to 36, the cable suspension points 12, 37 and the attachment surfaces 28, 29 formed thereof may alternatively to the version suggested in the embodiment comprise any arbitrary shape.

It is further also conceivable that one cable pull drive 10 simultaneously actuates at least two cable pulls 31 to 36. In this connection it is also conceivable that at least one cable pull 31 to 36 is attached to the attachment group 70 and to the drive platform 20 in such a way that the length of said cable pull 31 to 36 is unalterable.

It is further conceivable to replace the cable pulls 31 to 36 of the control arms depicted in FIG. 1 e.g. by Bowden cables, screw bars, pressure-actuated traveling hydraulic/pneumatic cylinders or other linear motors.

It is further pointed out that the telescope-like spacer rod 60 having an alterable length which is depicted in the embodiment may be replaced by a modified spacer rod the length of which is predetermined.

Figure 9:
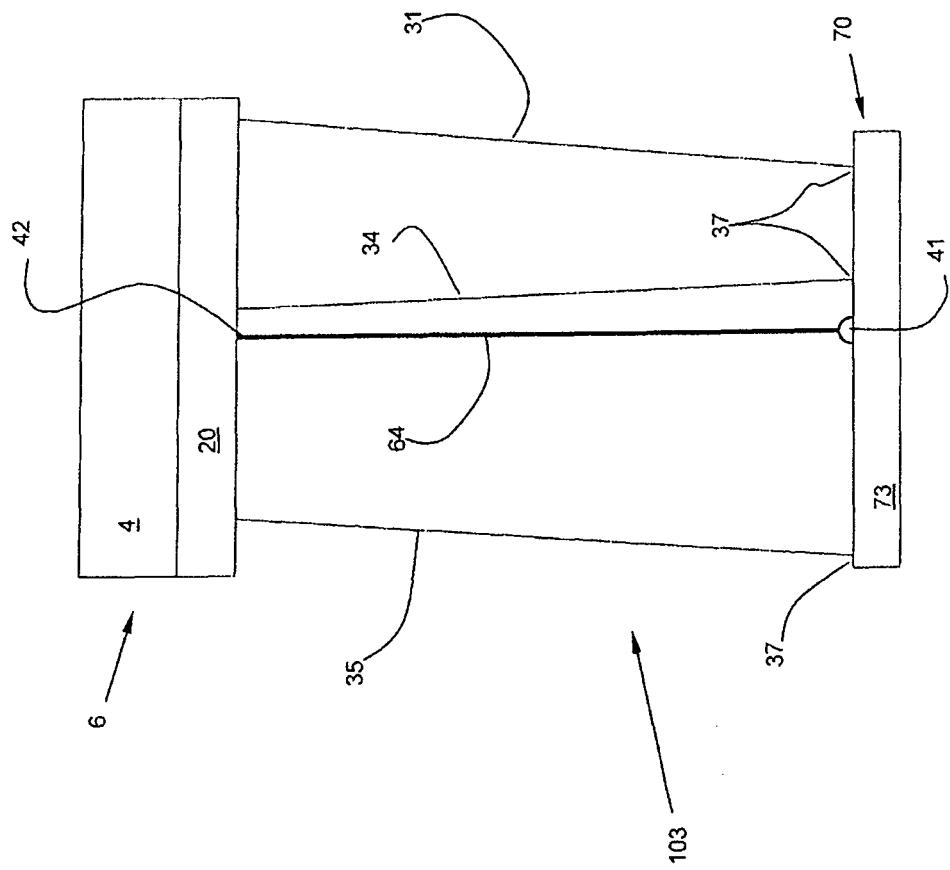
FIG. 9 shows a modified fourth cable robot module which is based on the third cable robot module depicted in FIG. 8.
Figure 10:
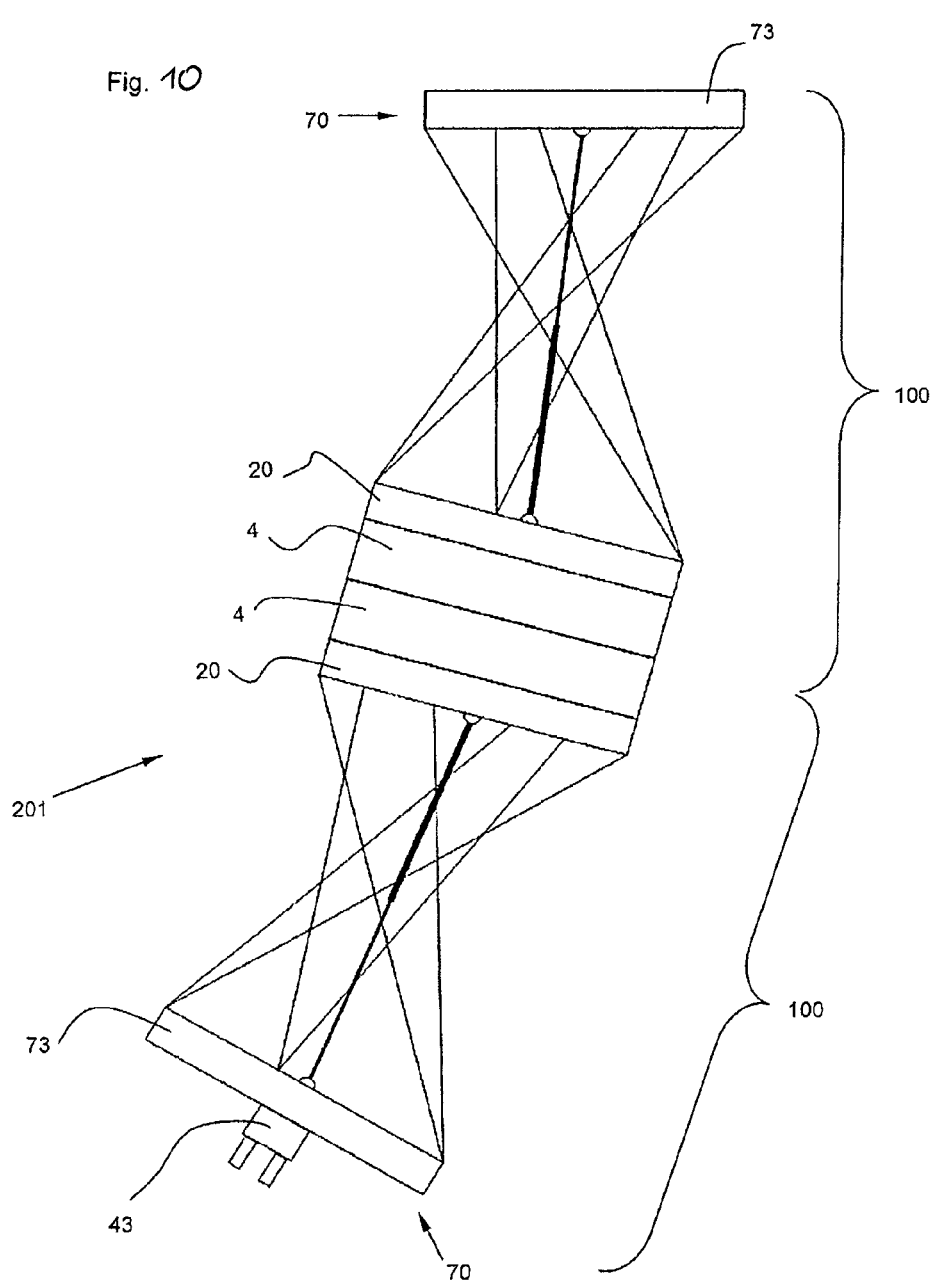
FIG. 10 depicts a first cable robot having two cable robot modules as depicted in FIG. 6.
Figure 11:
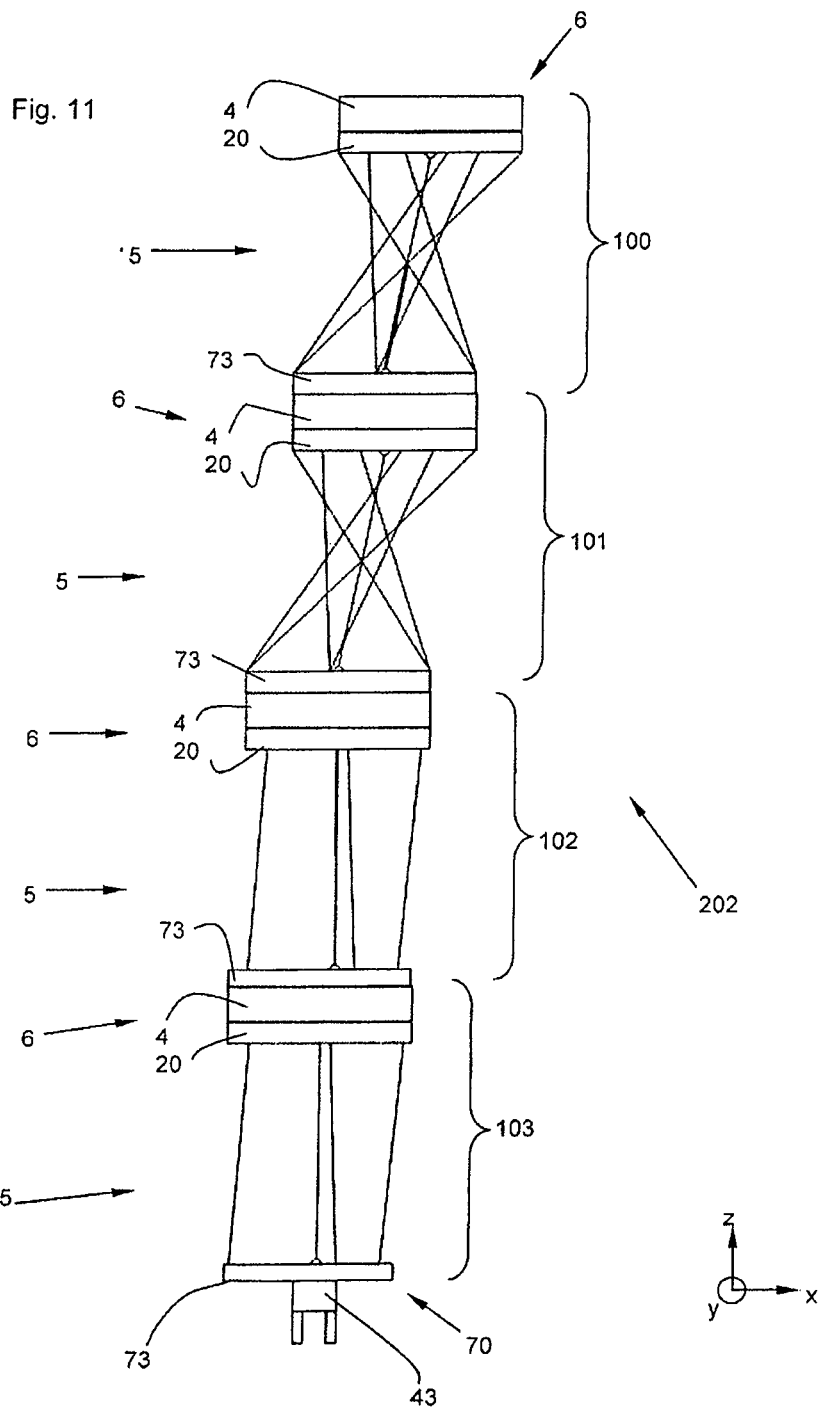
FIG. 11 depicts a cascaded second cable robot with the cable robot modules shown in FIGS. 6 to 9.

FIGS. 10 to 11 show two embodiments of robots in the assembled state comprising multiple robot modules in varying embodiments to which reference will be made in FIGS. 6 to 9.

Figure 6:
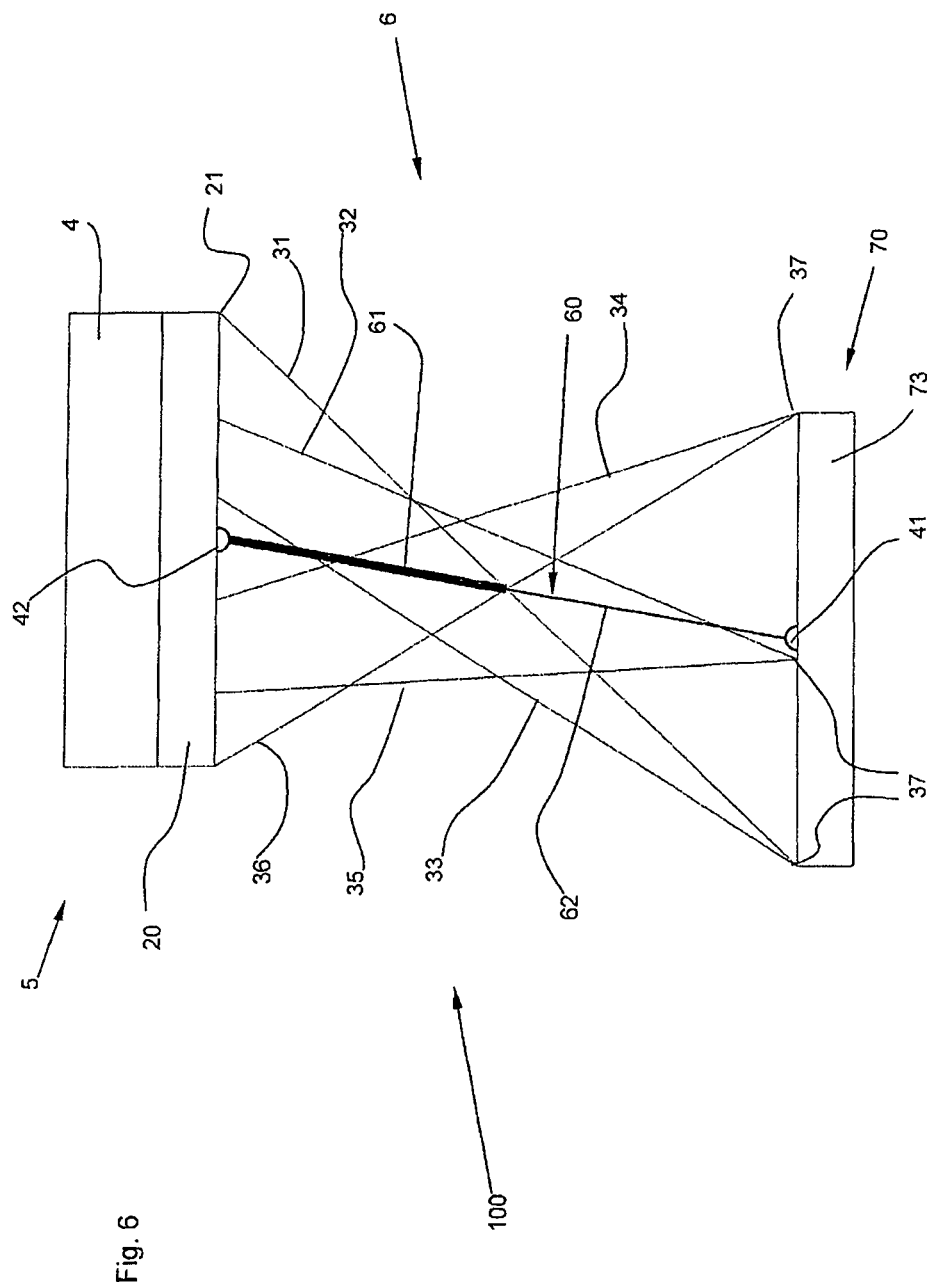
FIG. 6 depicts a schematic view of the cable robot shown in FIG. 1 as a first cable robot module.

FIG. 6 shows a schematic depiction of the first cable robot shown in FIG. 1 as a first cable robot module 100. The robot drive 6 of the first cable robot module 100 comprises a drive box 4 depicted in FIG. 6 the individual components of which are explained in conjunction with FIG. 1. On its top, the drive box 4 of the robot drive 6 comprises attachment elements (not depicted) in order to attach the drive box 4 to a corresponding drive box 4 (cf. FIG. 10) or to a corresponding attachment element (cf. FIG. 11). In addition, the drive box 4 may comprise a contact device (not depicted) in order to connect the robot drive 6 to a control device and/or a power supply at a complementary contact device of a control device and/or the contact device. Further, the drive box 4 protects the components arranged in it from environmental influences. With respect to the further components depicted in FIG. 6, reference is made to the preceding description in conjunction with FIG. 1.

Figure 7:
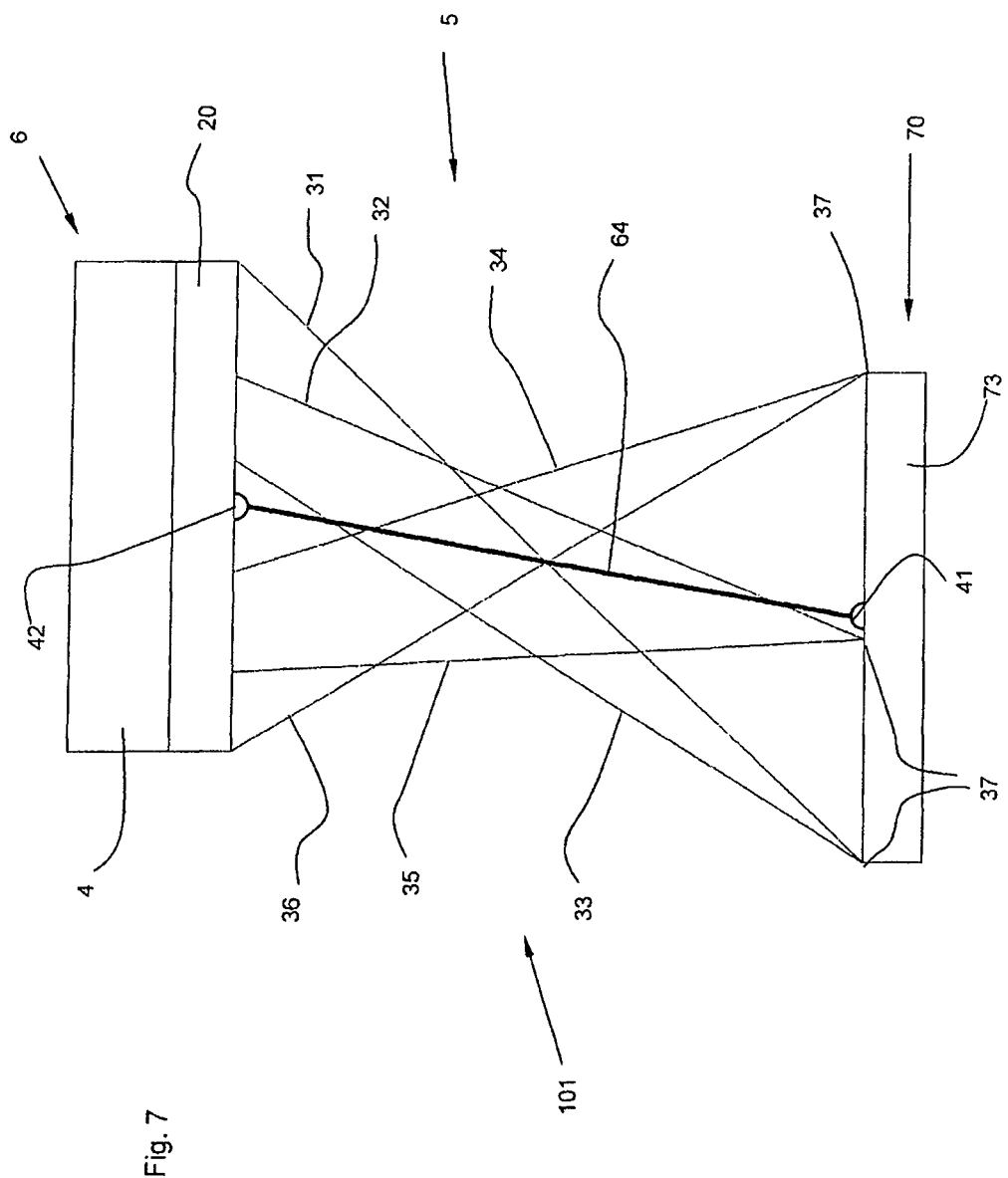
FIG. 7 depicts a modified second cable robot module which is based on the first cable robot module shown in FIG. 6.

FIG. 7 depicts a modified second cable robot module 101 which is based on the first cable robot module 100 shown in FIG. 6. Deviating from the embodiment of the first cable robot module 100 shown in FIG. 6, the second cable robot module 101 comprises a second spacer rod 64 having an unalterable length instead of the first spacer rod 60. As the first spacer rod 60, the second spacer rod 64 is also attached to the drive platform 20 and/or the work plate 73 of the attachment group 70 with the swiveling upper first joint 42 and a swiveling lower second joint 41. This embodiment guarantees that the attachment group 70 of the second cable robot module 101 may be tilted about the $x_1$-axis and the $y_1$-axis of the second spacer rod 64. Further, the drive platform 20 of the robot head 40 may be rotated about the surface normal or, respectively, the $z_2$-axis of the work plate 73 of the attachment group 70. By determining the second spacer rod 64, the attachment group 70 may be traversed on a ball socket. Altogether, five axes are provided for free movement of the attachment group 70 by means of the second cable robot module 101.

Figure 8:
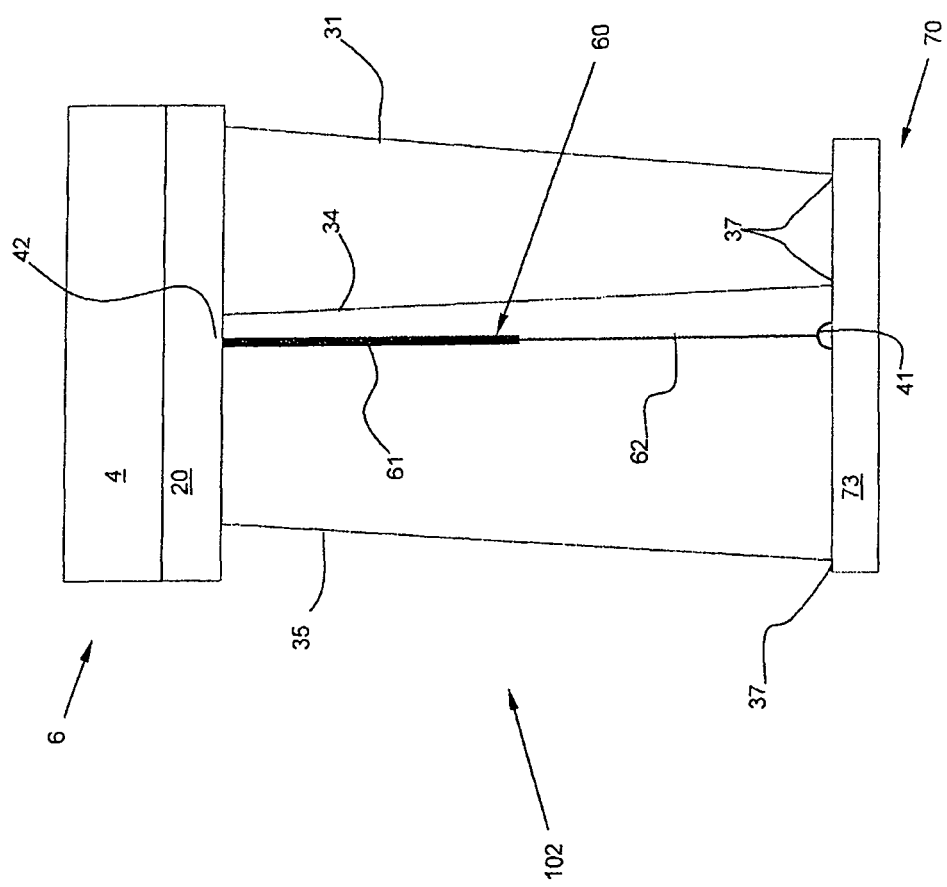
FIG. 8 depicts a modified third cable robot module which is based on the first cable robot module shown in FIG. 6.

FIG. 8 depicts a modified third cable robot module 102 which is based on the first cable robot module 100 shown in FIG. 6. The third cable robot module 102 essentially corresponds to the first cable robot module 100 depicted in FIG. 6. The third cable robot module 102 comprises three cable pulls 31, 34, 35 which connect the drive platform 20 with the work plate 73 of the attachment group 70. In contrast to the first cable robot module 100, the cable robot module 102 does not comprise additional cable pulls 32, 33, 36 shown in FIG. 1 so that a simply-configured third cable robot module 102 is provided.

In order to provide a statically defined cable robot module 102, the first spacer rod 60 depicted in the embodiment of FIG. 9 is rigidly connected to the drive platform 20 in the upper first joint 42. The lower second joint 41 is, as also depicted in FIGS. 6 to 8, configured in a pivotable manner.

Due to first spacer rod 60 being alterable in its length, the attachment group 70 may be moved along the z-axis of the drive platform 20. Further, the attachment group 70 may be swiveled about the $x_1$-axis and the $y_1$-axis of the first spacer rod 60 as well as twisted about the surface normal or, respectively, the $z_2$-axis of the work plate 73 of the attachment group 70 so that a cable robot module 102 having four movable axes may be provided in a simple manner.

FIG. 9 depicts a fourth cable robot module 103 which is based on the third cable robot module 102 depicted in FIG. 3. Further, the work plate 73 of the attachment group 70 is connected by means of the second spacer rod 64 instead of the first spacer rod. As shown in FIG. 7, the second spacer rod 64 is configured in one piece and comprises an unalterable length. The second spacer rod 64 is rigidly connected to the drive platform 20 in the first upper joint 42. The second spacer rod 64 is attached to the work plate 73 of the attachment group 70 via the lower second joint 41 in a pivotable manner.

By accordingly actuating the cable pull drives 10 of the cable pulls 31, 34, 35, the work plate 73 of the attachment group 70 may be swiveled about the $x_1$-axis and the $y_1$-axis of the second spacer rod 64 as well as twisted about the $z_2$-axis of the work plate 73.

It is pointed out that the cable robot modules 100 to 103 depicted in FIGS. 6 to 9 may be implemented in another or, respectively, a modified configuration. For example, the upper joint 42 which is configured in a rigid manner in the third and fourth cable robot module 102, 103 and the lower second joint 41 which is configured in a swiveling manner may be exchanged in their arrangement so that the work plate 73 of the attachment group 70 is rigidly connected to the spacer rod 60, 64. It is also conceivable to configure both joints 41, 42 in a rigid manner.

Further, it is alternatively conceivable that the additional cable pulls 32, 33, 36 or the cable pulls 31, 34, 35 are arranged at the upper part 61 of the spacer rod 60 or, respectively, at the second spacer rod 64 instead of the attachment at the work plate 73 of the attachment group 70 depicted in FIG. 1 to FIG. 3. In this manner, a particularly fast traverse of the attachment group 70 of the robot head 40 may be achieved.

FIG. 10 shows a first cable robot 1 having two first cable robot modules 100 as depicted in FIG. 6. The first cable robot 1 which is configured in a two-stage cascaded manner comprises, arranged at the top side, the first cable robot module 100, the first cable robot module 100 being twisted by approximately 180° with regard to the arrangement shown in FIG. 6. The first cable robot module arranged at the bottom side is depicted in an actuated state.

In this context, the two first cable robot modules 100 of the first cable robot 201 are arranged together at their drive boxes 4, the top-side first cable robot module 100 carrying the cable robot module 100 arranged at the bottom side via the drive box 4.

In the depicted embodiment, the work plate 73 of the attachment group 70 facing upwards serves for attaching the top-side first cable robot module 100 at a supporting frame which is not depicted, the attachment group 70 being attached to the supporting frame by means of corresponding attachment elements. The cable robot module 100 arranged below comprises the gripping device 43 at its attachment group 70. By combining the two first cable robot modules 100 having six axes, a cable robot having twelve axes is provided, wherein the axes may be actuated independently from each other. Instead of the first cable robot module 100 arranged on the top side and/or on the bottom side, one or multiple of the cable robot modules 101 to 103 depicted in FIGS. 7 to 9 may be arranged. In this context, the various cable robot modules 100 to 103 may be combined with each other according to the purpose of use of the first cable robot 1. For example, the third top-side cable robot module 102 depicted in FIG. 9 may be combined with the second cable robot module 101 arranged at the bottom side.

Furthermore, the modular configuration of the cable robot modules 100 to 103 provides the advantage that the individual cable robot modules may in a simple and quick manner be combined with each other via interfaces and attachment elements provided at the drive box 4 and the work plate 73 so that a first cable robot 1 may be provided which may be assembled in a simple and quick manner. This advantage is also supported by the attachment elements provided at the attachment group 70 and at the drive box 4 and their corresponding attachment elements and/or by the contact device provided at the attachment group or, respectively, its corresponding contact device so that also a quick assembly or, respectively, disassembly of the cable robot modules 100 to 103 is possible.

FIG. 11 shows a cascaded second cable robot 202 which is configured in a modular manner by means of the cable robot modules 100 to 103 depicted in FIGS. 6 to 9. The alignment of the individual cable robot modules 100 to 103 approximately corresponds to the alignment of the cable robot modules 100 to 103 shown in FIGS. 6 to 9. In this context, the first cable robot module 100 shown in FIG. 6 is with the drive box 4 attached at the top side to a supporting frame which is not shown and carries the cable robot modules 100 to 103 which are arranged in the second cable robot and combined with each other. At the bottom side of the work plate 73 of the first cable robot module 100, the second cable robot module 101 is attached with its drive box 4. The drive box 4 of the third cable robot module 102 is attached to the attachment group 70 of the second cable robot module 101. The work plate 73 of the third cable robot module 102 serves for attaching the drive box 4 of the fourth cable robot module 103, wherein the fourth cable robot module's attachment group 70 comprises the gripping device 43 arranged at the work plate 73.

The individual cable robot modules 100 to 103 are attached in a cascaded manner with the drive box 4 to the corresponding work plate 73 of the cable robot module 100 to 102 arranged above. In the arrangement depicted in FIG. 11, the individual cable robot modules 100 to 103 may be arranged together in a flexible manner and be combined with each other according to the necessary axes in the area of the respective cable robot module 100 to 103. It is thus conceivable that the second cable robot module 101 arranged in the embodiment is replaced by the fourth cable robot module 103 in order to be able to adapt the second cable robot to a certain required kinematic motion sequence.

Due to the flexible combination of the cable robot modules 100 to 103 with respect to number and arrangement, a second flexibly-configured cable robot 2 may be provided which may easily be adapted to a required motion sequence and the accompanying motion axes.

Furthermore, it is additionally conceivable that the cable pull drives 10 or, respectively, the additional cable pull drives 9 are arranged in the drive box 4 of the upper-most first cable robot module 100 for all cable robot modules 100 to 103. In this context, the cable pulls 31, 33, 34 or, respectively, the additional cable pulls 32, 35, 36 are guided to the second, third and fourth cable robot module 101, 102, 103, e.g. by means of Bowden cables so that a particularly light-weight second cable robot 2 may be provided. Furthermore, this configuration is particularly suitable for use in the food industry since only one drive box 4 has to be sealed off against the working space of the second cable robot 2 in order to protect the cable pull drives 10 or, respectively, the additional cable pull drives 9 of the cable robot modules 100 to 103 arranged in the drive box 4 from the aggressive cleaning agents used in the food industry.

The present invention provides a weight-optimized robot module and a weight-optimized robot which may be moved about numerous axes and may be adapted to a kinematic job in a flexible manner.

In an embodiment of the invention, a robot comprises a robot drive and a robot body. The robot body comprises a spacer rod, a robot head and at least one control arm. An attachment group of the robot drive and an attachment group of the robot head are connected to each other via the spacer rod and the control arm. A first attachment surface of the attachment group comprises a first gravity center and a second attachment surface of the drive platform comprises a second gravity center. Thereby, the first and the second rod suspension points of the spacer rod are arranged at the first and second gravity centers. The advantage thereof is that this configuration of the cable robot module is particularly stable. Furthermore, it is safeguarded that the robot head may be accelerated particularly quickly and with a low energy effort so that the traverse times within the working space of the robot module may be reduced.

In another embodiment of the invention, the spacer rod with a drive platform of the robot drive and with the robot head of the robot body is configured in a torsion-proof manner with regard to a twist about a longitudinal axis of the spacer rod via a joint. In this manner, it is safeguarded that the spacer rod is prevented from being twisted.

In a further embodiment of the invention, the torsion-proof joint is configured as homokinetic joint or cardan joint. In this manner, it is safeguarded that the spacer rod is attached to the drive platform and the robot head in a torsion-proof manner, but that at the same time two degrees of freedom for swiveling the joint are provided.

In a further embodiment of the invention, the spacer rod of the cable robot module is configured in a telescope-like manner and comprises an alterable length. In this manner, the cable robot may be provided with an additional degree of freedom or, respectively, an additional movement dimension.

In a further embodiment, the cable robot module comprises at least three cable pulls with corresponding cable pull drives and a spacer rod. Each cable pull is connected to the attachment group in a first cable suspension point and connected to the drive platform in a second cable suspension point. The first cable suspension points of the attachment group form a first attachment surface and the second cable suspension points of the drive platform form a second attachment surface. The spacer rod is attached to the attachment group at a first rod suspension point and to the drive platform at a second rod suspension point. Thereby, the first rod suspension point is arranged within the first attachment surface and the second rod suspension point is arranged within the second attachment surface. Furthermore, the attachment group or the drive platform of the first cable robot module is arranged at the attachment group or at the drive platform of the second cable robot module. As an advantage of this, a cable robot module may be provided the moving masses of which are particularly small which results in the cable robot being able to traverse in a working space with high acceleration and speed.

In a further embodiment of the invention, the cable robot module comprises at least three additional cable pulls, wherein one cable pull and an additional cable pull are respectively adjacently arranged next to each other. Furthermore, one cable pull and an adjacent cable pull are respectively attached to the attachment group in a first cable suspension point of the cable pull. Furthermore, the additional cable pulls are attached to the drive platform in further second cable suspension points. The second cable suspension points of the cable pulls form a first triangle and the further second cable suspension points of the additional cable pulls form a second triangle, wherein the second triangle is twisted with regard to the first triangle. In this manner, a cable robot module is provided which may be relocated, tilted and/or twisted about numerous axes and which thus may trace complex kinematic motion sequences.

In a further embodiment of the invention, a corresponding additional cable pull drive is provided for each additional cable pull. In this manner, the additional cable pulls may be actuated and controlled in the same manner as the original cable pulls.

In a further embodiment of the invention, the first cable suspension points of the cable pulls and of the additional cable pulls each comprise a first distance. Furthermore, the second cable suspension points of the cable pulls each comprise a second distance with regard to the adjacent further second cable suspension points of the additional cable pulls, the first distances having the same ratio as the corresponding second distances. In this manner, a cable robot module is provided which comprises a particularly advantageous post-oscillation behavior.

In a further embodiment of the invention, the cable pull is guided by means of at least one deflection pulley, the deflection pulley being attached to the drive platform and being configured to at least partially support a tensile force of the cable pull on the drive platform. In this manner, the cable pull drive may be arranged in a space-saving way without affecting the functionality of the robot drive.

In a further embodiment of the invention, the robot head comprises an actuator group which is coupled with the attachment group by means of a transmission gearing, the transmission gearing converting a twist of the attachment group into a twist of the actuator group according to a predetermined transmission ratio. In this manner, it is safeguarded that an actuator arranged at the actuator group, e.g. a gripping device, comprises an enlarged range of rotation.

In a further embodiment of the invention, the transmission gearing is configured as a planetary gearing with a sun gear which is connected to the actuator group. In this manner, a particularly flat configuration of the robot head may be provided.

In a further embodiment of the invention, an annulus gear of the planetary gearing is connected to the attachment group and the planet gears of the planetary gearing are connected to the spacer rod. This allows for a simple configuration of the robot head.

In a further embodiment of the invention, the attachment group comprises a planetary carrier, the planetary carrier being mounted at an attachment plate of the attachment group pivotable manner. The attachment plate is connected to the control arm. Furthermore, the planetary carrier is connected to the spacer rod. In this manner, a rotation of the planetary carrier about the surface normal of the attachment group may be prevented.

In a further embodiment of the invention, the actuator group is axially mounted by means of a bolt connection which is attached to the planetary carrier. This is a simple option for bearing the actuator group.

In a further embodiment of the invention, the attachment plate radially encircles the annulus gear of the planetary gearing, wherein the attachment plate provides a first radial bearing for the planetary carrier and a second radial bearing for the actuator group. Thereby, the annulus gear is arranged between the first bearing and the second bearing. This allows for a particularly compact configuration of the robot head.

In a further embodiment of the invention, the robot comprises a separating wall which is arranged between the robot drive and the robot body and spatially separates the robot drive from the robot body. Thereby, the separating wall comprises at least one lead-through for the control arm. This configuration is particularly suitable for use in food industry. For cleaning the robot body, aggressive and, as the case may be, corrosive cleaning agents are going to be used in this context, wherein by means of the spatial separation of the robot drive from the robot body, the robot drive may be protected from the cleaning agents in a cost-efficient and simple manner. This advantage also results in the fact that for the cable pull drive components may be used which usually do not comprise a sealing resistant to cleaning agents.

In another embodiment of the invention, a robot comprises at least a first and a second robot module, wherein the attachment group or the drive platform of the first robot module is arranged at the attachment group or at the drive platform of the second robot module. The advantage thereof is that a robot may be provided the moving masses of which are particularly small, which results in the robot being able to traverse in a working space with high acceleration and velocity. Furthermore, the robot may be flexibly adapted to its kinematic job by means of the two robot modules.

While the foregoing is directed to embodiments of the invention, other and further embodiments of this invention may be devised without departing from the basic scope of the invention, the scope of the present invention being determined by the claims that follow.

The invention claimed is:

1. A robot module comprising
a robot drive and a robot body, the robot body having a spacer rod, a robot head and at least one control arm,
wherein a drive platform of the robot drive and an attachment group of the robot head are connected to each other via the spacer rod and the coral arm,
wherein the robot drive is configured to swivel the robot head by means of the spacer rod and the control arm,
wherein an attachment surface of the attachment group comprises a first gravity center and an attachment surface of the drive platform comprises a second gravity center, wherein the spacer rod is arranged in the first and the second gravity center, and
wherein the robot head comprises an actuator group and the attachment group, the actuator grouped being coupled to the attachment group by a transmission gearing,
wherein the transmission gearing is configured as planetary gearing,
wherein a sun gear of the planetary gearing is connected to the actuator group,
wherein an annulus gear of the planetary gearing is connected to the attachment group, and
wherein at least one planet gear of the planetary gearing is connected to the spacer rod.

2. The robot module according to claim 1, wherein the spacer rod is connected to the drive platform of the robot drive and to the attachment group of the robot head, respectively, via a joint in a torsion-proof manner with regard to a twist about a longitudinal axis of the spacer rod.

3. The robot module according to claim 2, wherein the torsion-proof joint is configured as homokinetic joint or cardan joint.

4. The robot module according to claim 1, wherein the spacer rod is configured in a telescope-like manner and comprises an alterable length.

5. The robot module according to claim 1, wherein at least three cable pulls with corresponding cable pull drives are provided as control arms, wherein each cable pull is connected to the attachment group in a first cable suspension point and is connected to the drive platform in a second cable suspension point, wherein the first cable suspension points of the attachment group form a first attachment surface and the second cable suspension points of the drive platform form a second attachment surface.

6. The robot module according to claim 5, wherein at least three additional cable pulls are provided, wherein one cable pull and one additional cable pull are respectively arranged in an adjacent manner next to each other and are in the one first cable suspension point of the cable pull attached to the attachment group, wherein the additional cable pulls are attached to the drive platform in further second cable suspension points, wherein the second cable suspension points of the cable pulls form a first triangle, wherein the further second cable suspension points of the additional cable pulls form a second triangle, and wherein the second triangle is twisted with regard to the first triangle.

7. The robot module according to claim 1, wherein a corresponding additional cable pull drive is provided for each additional cable pull.

8. The robot module according to claim 1, wherein the first cable suspension points of the cable pulls and the additional cable pulls respectively comprise a first displacement, wherein the second cable suspension points of the cable pulls respectively comprise a second displacement with regard to the adjacent further second cable suspension points of the additional cable pulls, and wherein the first displacements have the same ratio as the corresponding second displacements.

9. The robot module according to claim 1, wherein the cable pull is guided by means of a deflection pulley, wherein the deflection pulley is arranged at the robot drive and at least partially supports a tensile force of the cable pull.

10. The robot module according to claim 1, further comprising a separating wall, the separating wall being arranged between the robot drive and the robot body to spatially separate the robot drive from the robot body, wherein the separating wall comprises at least one sealed control arm guidance.

11. The robot module according to claim 1, wherein the transmission gearing is configured to convert a twist of the attachment group into a twist of the actuator group according to a predetermined transmission ratio.

12. The robot module according to claim 1, wherein the attachment group comprises a planetary carrier, wherein the planetary carrier is supported at an attachment plate of the attachment group in a pivotable manner, wherein the attachment plate is connected to a control arm, and wherein the planetary carrier is connected to the spacer rod.

13. The robot module according to claim 12, wherein the sun gear of the planetary gearing is axially supported by means of an attachment bolt attached to the planetary carrier.

14. The robot module according to claim 13, wherein the attachment plate radially encompasses the annulus gear of the planetary gearing, wherein the attachment plate provides a first radial bearing for the planetary carrier and a second radial bearing for the actuator group and wherein the annulus gear is arranged between the first bearing and the second bearing.

15. The robot module according to claim 1, the robot head comprising an actuator group and the attachment group, the actuator group being coupled to the attachment group by means of a transmission gearing;
wherein the transmission gearing is configured to convert a twist of the attachment group into a twist of the actuator group according to a predetermined transmission ratio,
wherein an attachment surface of the attachment group comprises a first gravity center and an attachment surface of the drive platform comprises a second gravity center, wherein the spacer rod is arranged in the first and the second gravity center,
wherein at least three cable pulls with corresponding cable pull drives are provided as control arms, wherein each cable pull is connected to the attachment group in a first cable suspension point and is connected to the drive platform in a second cable suspension point, wherein the first cable suspension points of the attachment group form a first attachment surface and the second cable suspension points of the drive platform form a second attachment surface, and
wherein at least three additional cable pulls are provided, wherein one cable pull and one additional cable pull are respectively arranged in an adjacent manner next to each other and are in the one first cable suspension point of the cable pull attached to the attachment group, wherein the additional cable pulls are attached to the drive platform in further second cable suspension points, wherein the second cable suspension points of the cable pulls form a first triangle, wherein the further second cable suspension points of the additional cable pulls form a second triangle, and wherein the second triangle is twisted with regard to the first triangle.

* * * * *